United States Patent [19]

Konno et al.

[11] Patent Number: 5,142,173
[45] Date of Patent: Aug. 25, 1992

[54] BEARING STRUCTURE

[75] Inventors: Daisuke Konno; Sachihiko Miwa, both of Kanagawa; Shunichi Aiyoshizawa, Tokyo; Kazuyuki Kasahara, Kanagawa; Yoshio Sato, Kanagawa; Kazuto Hirokawa, Kanagawa; Yumiko Noda, Kanagawa, all of Japan

[73] Assignee: Ebara Corporation, Tokyo, Japan

[21] Appl. No.: 564,313

[22] Filed: Aug. 8, 1990

[30] Foreign Application Priority Data

Aug. 11, 1989 [JP] Japan ................................. 1-206920
Aug. 17, 1989 [JP] Japan ................................. 1-211743

[51] Int. Cl.⁵ ........................... H02K 7/08; H02K 5/16
[52] U.S. Cl. ..................................... 310/67 R; 310/90; 384/107; 384/292; 360/98.07
[58] Field of Search ................... 310/90, 67 R, 51, 52; 384/100, 107, 112, 101, 102, 113, 292; 360/98.06, 98.07, 99.04

[56] References Cited

U.S. PATENT DOCUMENTS

| | | |
|---|---|---|
| 3,854,781 | 12/1974 | Bildtsen ................................ 384/102 |
| 3,950,039 | 4/1976 | Huber et al. ......................... 308/3 R |
| 4,487,514 | 12/1984 | Mori ..................................... 384/113 |
| 4,557,610 | 12/1985 | Asada et al. ......................... 384/107 |
| 4,599,664 | 7/1986 | Schuh ................................... 360/97 |
| 4,652,149 | 3/1987 | Nakaoka et al. .................... 384/107 |
| 4,656,545 | 4/1987 | Kakuta ................................. 360/98 |
| 4,805,972 | 2/1989 | Tanaka et al. ...................... 310/90 X |

FOREIGN PATENT DOCUMENTS

| | | |
|---|---|---|
| 0019339 | 11/1980 | European Pat. Off. . |
| 0117873 | 9/1984 | European Pat. Off. . |
| 0181950 | 5/1986 | European Pat. Off. . |
| 2404325 | 7/1975 | Fed. Rep. of Germany . |
| 3303499 | 8/1983 | Fed. Rep. of Germany . |
| 1501093 | 10/1967 | France . |
| 0005518 | 1/1983 | Japan ................................. 384/107 |
| 59-28757 | 2/1984 | Japan . |
| 63-87162 | 4/1988 | Japan . |
| 63-100416 | 5/1988 | Japan . |
| 63-241515 | 10/1988 | Japan . |
| 63-241516 | 10/1988 | Japan . |
| 63-241517 | 10/1988 | Japan . |
| 1-206920 | 8/1989 | Japan . |
| 1-211743 | 8/1989 | Japan . |
| 2-3517 | 1/1990 | Japan . |
| 2-3518 | 1/1990 | Japan . |
| 2-5720 | 1/1990 | Japan . |
| 2-5721 | 1/1990 | Japan . |
| 0759764 | 8/1980 | U.S.S.R. ............................. 384/101 |

OTHER PUBLICATIONS

Design of Gas Bearings, vol. I, pp. 6.1.21-42.
Design of Gas Bearings, vol. II, pp. 6.3.1-24.
Ebara Engineering Review, No. 143, Apr. 1989, pp. 16-20.
Journal of Japanese Society of Tribologists, vol. 34, No. 2, Feb. 15, 1989, pp. 49-52.

*Primary Examiner*—Steven L. Stephan
*Assistant Examiner*—E. H. To
*Attorney, Agent, or Firm*—Wenderoth, Lind & Ponack

[57] ABSTRACT

A bearing structure suitable for a spindle motor or the like, which enables such a motor to rotate with minimal vibrations. The bearing structure comprises a stator including a support shaft which is disposed on a base, and a rotor which is rotatably disposed around the support shaft. A radial hydrodynamic bearing and a thrust hydrodynamic bearing are disposed between the stator and the rotor. The stator has the support shaft, a thrust plate and a radial cylindrical member which is concentric with the support shaft. The thrust plate is secured to an end surface of the radial cylindrical member. The support shaft extends through the centers of the radial cylindrical member and the thrust plate. The rotor has a radial sleeve. The radial hydrodynamic bearing is formed from the inner peripheral surface of the radial sleeve and the outer peripheral surface of the radial cylindrical member, which face each other and either of which is formed with herringbone-shaped grooves for generating dynamic pressure. The thrust hydrodynamic bearing is formed from an end surface of the radial sleeve and a sliding surface of the thrust plate, which face each other and either of which is formed with spiral grooves for generating dynamic pressure. A rolling bearing may be added in order to minimize the starting torque in the bearing structure.

10 Claims, 5 Drawing Sheets

BEARING STRUCTURE

BACKGROUND OF THE INVENTION

The present invention relates to a bearing structure for a spindle motor, which employs hydrodynamic bearings as radial and thrust bearings so that the spindle motor is capable of rotating at high speed with minimal vibrations. More particularly, the present invention relates to a bearing structure which enables a spindle motor to exhibit an excellent rotating performance irrespective of the position of the motor when used and hence is suitable for a laser scanner motor, a hard disk driver (hereinafter referred to as simply "HDD"), etc.

With the developement of HDDs with a high storage capacity and low power consumption, a demand has arisen for improvement in the performance of spindle motors which are used to drive them so that these spindle motors are even more suitable therefor.

Figure 8:
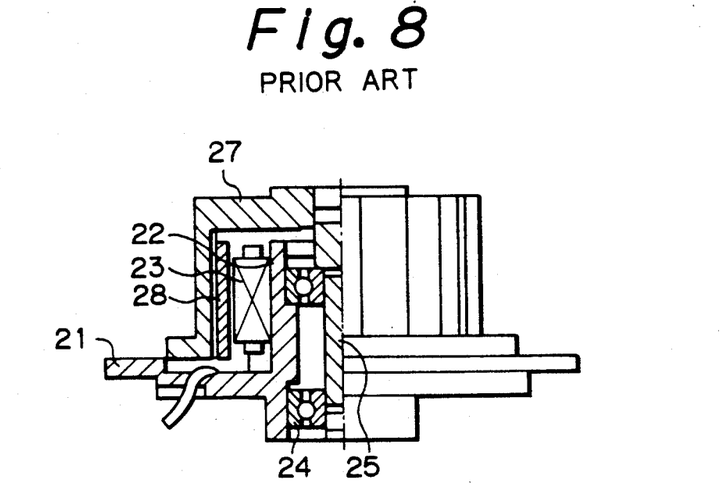
FIG. 8 is a partially sectioned elevational view of a conventional spindle motor for an HDD.

FIG. 8 is a partially sectioned elevational view of a conventional spindle motor for HDD. The spindle motor has a shaft support cylinder 22 in the center of a base 21. A group of stator coils 23 are secured to the outer periphery of the shaft support cylinder 22. A rotary shaft 25 is rotatably supported by the inner periphery of the shaft support cylinder 22 with ball bearings 24 interposed therebetween. The rotary shaft 25 has a rotor 27 secured to the upper end thereof, the rotor 27 being adapted to have hard disks fixedly mounted on the outer peripheral surface thereof. The rotor 27 has a group of rotor magnets 28 secured to the inner peripheral surface in opposing relation to the group of stator coils 23.

In the above-described spindle motor employing ball bearings, the magnitude of vibrations of the spindle motor depends on the internal clearances of the ball bearings. The magnitude of vibrations in the radial direction is substantially equal to the radial internal clearance of the ball bearings. Similarly, the magnitude of vibrations in the thrust direction is substantially equal to the thrust internal clearance of the ball bearings. Measures have been taken to reduce these internal clearances, for example, preloading the ball bearings. However, no satisfactory internal clearance value has heretofore been obtained, i.e., it has only been possible to achieve 0.5 microns or so in terms of the non-repeated component of the runout in the radial direction. In addition, preloading of ball bearings results in an increase in the required torque of the motor and hence works against to the desirous lowering in the power consumption of the HDD. Accordingly, as long as ball bearings such as those described above are used, it is in principle virtually impossible to further reduce the vibrations of the spindle motor.

In addition, the speed of motation of scanner motors for use in laser printers, for example, is increasing year by year, so that is has become difficult for conventional ball bearings to cope with the high rotational speed of these motors.

Figure 9:
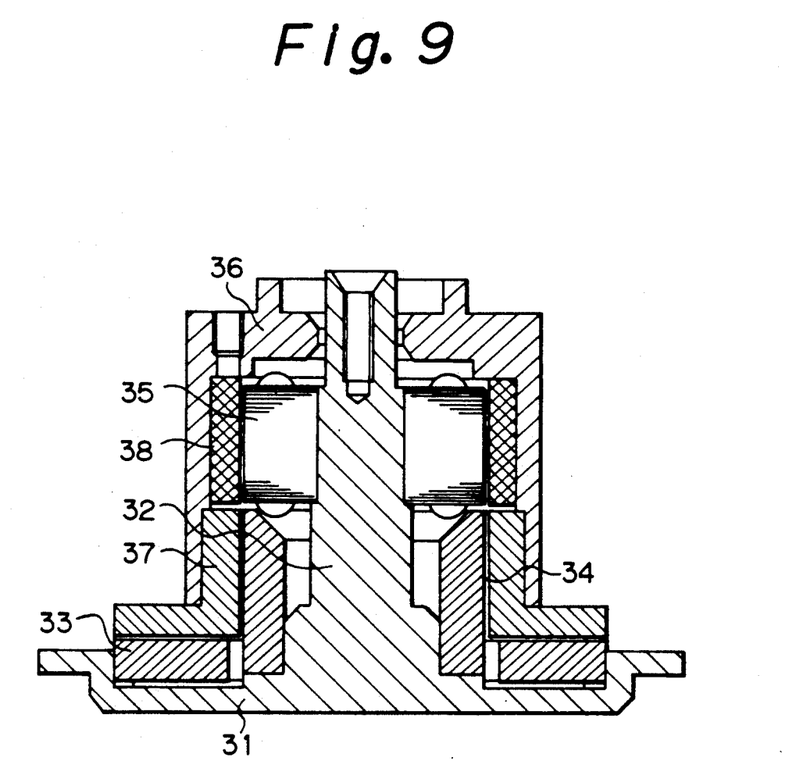
FIG. 9 is a sectional view of a spindle motor which employs hydrodynamic bearings, according to the earlier application by the present applicant in advance of this application.

Under these circumstances, spindle motors which employ hydrodynamic bearings to realize a highly accurate rotatin performance have been porposed. FIG. 9 is a sectional view of a spindle motor which employs hydrodynamic bearings, according to an application by the present applicant in field advance of this application, now U.S. Pat. No. 4,998,033. Referring to FIG. 9 a base 31 has a support shaft 32 stood on the central portion thereof. An annular thrust plate 33 is secured to the base 31, and a cylindrical radial bearing member 34 is concentrically secured to the support shaft 32. A plurality of equally spaced stator coils 35 are secured to the support shaft 32 above the cylindrical radial bearing member 34. On the other hand, a rotor 36 has a cap-shaped configuration. The top portion at the upper end of the rotor 36 is loosely fitted on the upper end portion of the support shaft 32. The rotor 36 has an annular member 37 secured to the lower end portion thereof, the annular member 37 having an L-shaped cross-sectional configuration. The lower end portion of the annular member 37 faces the thrust plate 33 to form a thrust hydrodynamic bearing having spiral grooves. The inner peripheral surface of the annular member 37 faces the radial bearing member 34 to form a radial hydrodynamic bearing having herringbone-shaped grooves.

A plurality of equally spaced rotor magnets 38 are secured to the inner periphery of the rotor 36 in opposing relation to the stator coils 35. As the stator coils 35 are sequentially supplied with an electric current, the rotor 36 having the rotor magnets 38 begins to rotate and consequently a pneumatic pressure is generated between the upper surface of the thrust plate 33 and the lower surface of the annular member 37, thus forming a pneumatic thrust bearing. Similarly, a pneumatic pressure is generated between the outer peripheral surface of the radial bearing member 34 and the inner peripheral surface of the annular member 37, thus forming a penumatic radial bearing. Since the annular member 37 is supported without being in solid contact with the associated members, the spindle motor is capable of smoothly rotating at high speed in contrast to the prior art that employs ball bearings.

However, the above-described spindle motor still suffers from the problem that, when it is operated in a horizontal position (i.e., in a direction in which the direction of gravity is perpendicular to the shaft of the motor), a moment in the radial direction is generated due to the gravity of the rotor, causing the radial bearing to be inclined with respect to the support shaft, which results in an increase in the imbalance of radial magnetic force acting between the rotor magnets and the stator coils, and in this state the rotor is brought into local contact with the bearing.

Further, since the bearings are comprised of a number of discrete members, it is difficult to achieve the required perpendicularity at the time of assembly.

In addition to the problem described above, when the conventional spindle motors that employ hydrodynamic bearings are used in a horizontal position, the following problems are experienced:

First, the magnitude of vibrations during rotation is large.

Secondly, when two discrete bearings are used, it is difficult to align them concentrically at the time of assembly. In particular, since the clearance between a movable piece and a fixed piece of a radial bearing is on the order of microns, it is difficult to align them concentrically during the manufacturing process. In the case of a bearing structure in which two thrust bearings are provided separately from each other, it is difficult to adjust the relative position of the two thrust bearings. In addition, since the thrust collar of a thrust bearing is produced so that the parallelism is within several microns and it is necessary to hold down the parallelism to about 1 micron when it is assembled, it is very difficult to produce it.

Thirdly, in a radial gap type spindle motor such as that shown in FIG. 9, a moment is generated due to the imbalance of radial magnetic force acting between the rotor magnet group and the stator coil group, causing the axis of the rotor to be inclined with respect to the support shaft, which results in an increase in the starting torque because of local contact of the dynamic pressure surfaces. During rotation, unstable radial magnetic force, which is added to the dynamic pressure, causes whirling of the rotor and therefore makes it impossible to obtain a satisfactory operating condition.

In view of the above-described problems, it is an object of the present invention to provide a bearing structure suitable for use in a spindle motor, which employs hydrodynamic bearings to improve the high-speed rotating performance and minimize the vibration irrespective of the position of the motor when used.

SUMMARY OF THE INVENTION

To attain the above-described object, the present invention provides a bearing structure which includes a base, a support shaft which is disposed in the center of the base, a radial cylindrical member through in the center of which the support shaft extends, a thrust plate which is secured to an end face of the cylindrical member at the base and a fixing member through in the center of which the support shaft extends, and a radial sleeve which is rotatably supported by the outer peripheral surface of the radial cylindrical member and the thrust plate, wherein a radial hydrodynamic bearing is formed by between the radial cylindrical member and the radial sleeve, and a thrust hydrodynamic bearing is formed between an end portion of the radial sleeve and the thrust plate.

When the bearing structuer employs a single thrust plate, the thrust hydrodynamic bearing can be preloaded by a magnetic force acting counter to a dynamic pressure acting in the direction of thrust. When two thrust plates are employed, a perload can be applied by a magnetic force acting counter to a dynamic pressure generated in the thrust direction by a thrust bearing that is formed by one of the thrust plates.

In that case of a radial gap type motor, the preloading is preferably effected by offsetting the axial center of a magnet member which comprises a group of rotor magnets or magnetic pieces such as iron cores from the axial center of the group of stator coils by a predetermined distance in a direction in which the rotor magnets come away from the thrust bearing, or making the motor driving part a thrust gap type.

In the present invention, at least one of the radial and thrust bearings is formed from a ceramic material, preferably silicon carbide or alumina.

The outer peripheral surface of the radial cylindrical member and the inner peripheral surface of the radial sleeve, which constitute a radial hydrodynamic bearing, can each be produced by coating a base material thereof with a material which is different from the base material, or surface treating the base material. Similarly, the end surface of the radial sleeve and the surface of the thrust plate, which constitute a thrust hydrodynamic bearing, can each be produced by coating a base material thereof with a material which is different from the base material, or surface treating the base material.

The material used for coating the base material can consist of the same components of the base material, e.g., a certain nickel coating can form a layer which is harder and has a finer crystalline structure than the nickel material of the base material and can improve the smoothness of the base surface. Accordingly, the material which is different from the base material described in this specification and claims includes materials same king but different in physical or chemical properties.

The arrangement may be such that the radial sleeve alone is disposed on the rotor and the other members are disposed on the stator, or vice versa.

When a spindle motor is provided with the bearing structure of the present invention, the radial hydrodynamic bearing is disposed so as to support the rotor over a predetermined range including the center of gravity of the rotor in the radial direction.

Further, the present invention provides a spindle motor which is formed by adding a driving part of the bearing structure having the above-described features.

According to the present invention having the above-described arrangement, the required perpendicularity between the thrust plate and the radial cylindrical member at the time of assembling can be readily realized by clamping them together by means, for example, of a fixing nut, provided that the thrust plate is produced with the required flatness and the radial cylindrical member is produced so that the end surface and the outer peripheral surface are at right angles to each other.

When two thrust plates are employed, the spacing between these two plates is equal to the height of the radial cylindrical member, provided that the radial cylindrical member, which is easy to machine, is produced with the correct height. Therefore, the two thrust plates can be readily assembled with a predetermined spacing.

Since the radial sleeve functions as bearing members of both the radial and thrust bearings, the number of parts required to form the bearing structure reduced and the structure is simplified.

According to the present invention, the inclination of the radial bearing with respect to the support shaft can be corrected by magnetically applying a preload in the direction of thrust. Accordingly, no local contact occurs and it is therefore possible to minimize the starting torque. In addition, the rotor is prevented from being sprung out by the dynamic pressure acting in the thrust direction, so that the rotor rotates stably. Even when the spindle motor is used in a horizontal position, the rotor rotates stably.

If the members that constitute thrust and radial bearings are formed from a ceramic material, the spindle motor can be used without lubrication or with minimal lubrication, and both the starting torque and load torque can be reduced.

In addition, in the case of an inner rotor type motor, the radial sleeve can be disposed on the stator, whereas, in the case of an outer rotor type motor, the radial cylindrical member can be disposed on the stator, and when a spindle motor is provided with the bearing structure of the present invention, the radial bearing can be disposed to support the rotor over a predetermined range including the center of gravity of the rotor, so that the rotor rotates stably irrespective of the position of the motor when used.

According to another aspect of the present invention, the bearing structure comprises a stator having a support shaft which is disposed in the center of a base, and a rotor which has a through-hole in the center for insertion of the support shaft, the rotor being supported by the support shaft through a radial hydrodynamic bearing which is formed to be concentric and integral with the support shaft, the rotor being further supported by the stator through a thrust hydrodynamic bearing, and the rotor being further supported by the support shaft through a rolling bearing.

At leat one of the radial bearing, thrust bearing and support shaft or a part thereof is formed from a ceramic material, for example, silicon carbide, alumina, etc.

In addition, a preload can be magnetically applied in a counter direction to a dynamic pressure that is generated by the thrust bearing.

In addition, a resilient pad, made of a resilient material, e.g., silicone rubber, is interposed between the thrust bearing and the stator.

In addition, a magnet member, that is a group of rotor magnets or rotor cores, is disposed on the rotor, and a group of stator coils are disposed on the stator in opposing relation to the magnet member, thereby forming a spindle motor.

By using a rolling bearing jointly with the hydrodynamic bearings, the rotor is supported by the rolling bearing at the time when the motor is started and rotating at low speed, so that the starting torque and the initial rotation torque are minimized. When the motor is rotating at high speed, the rotor is supported by the hydrodynamic bearings, and it is therefore possible to obtain a highspeed and highly accurate rotating performance, which is characteristic of hydrodynamic bearings. In addition, since the radial bearing can be shortened, when the bearing structure is utilized for a spindle motor, it is possible to obtain a relatively large space for disposing the motor driving part.

By magnetically applying a preload in the direction of thrust, the inclination of the radial bearing with respect to the support shaft is corrected, so that the problem of local contact is eliminated and the starting torque is minimized. In addition, the rotor is prevented from being sprung out by the dynamic pressure acting in the thrust direction, so that the rotor rotates stably. Particularly, in a case where the bearing structure is utilized for a spindle motor, even when the spindle motor is used in a horizontal position, the rotor rotates stably.

If the members that constitute the hydrodynamic bearings are formed from an inorganic material having superior wear resistance, such as a ceramic material, the spindle motor can be used without lubrication or with minimal lubrication, and both the starting torque and load torque can be reduced.

At least one of the opposing annular sliding surfaces that constitute the thrust hydrodynamic bearing can be produced by coating a base material thereof with a material which is different from the base material, or surface treating the base material. Similarly, at least one of the opposing cylindrical sliding surfaces that constitute the radial hydrodynamic bearing can be produced by coating a base material thereof with a material which is different from the base material, or surface treating the base material.

The material used for coating the base material can consist of the same components of the base material, e.g., a certain nickel coating can form a layer which is harder and less porous than the nickel material of the base material and can improve the smoothness of the base surface. Accordingly, the material which is different from the base material described in this specification and claims includes materials of the same kind but different in physical or chemical properties.

DESCRIPTION OF THE PREFERRED EMBODIMENTS

Embodiments of the present invention will be described below with reference to the accompanying drawings.

Figure 1:
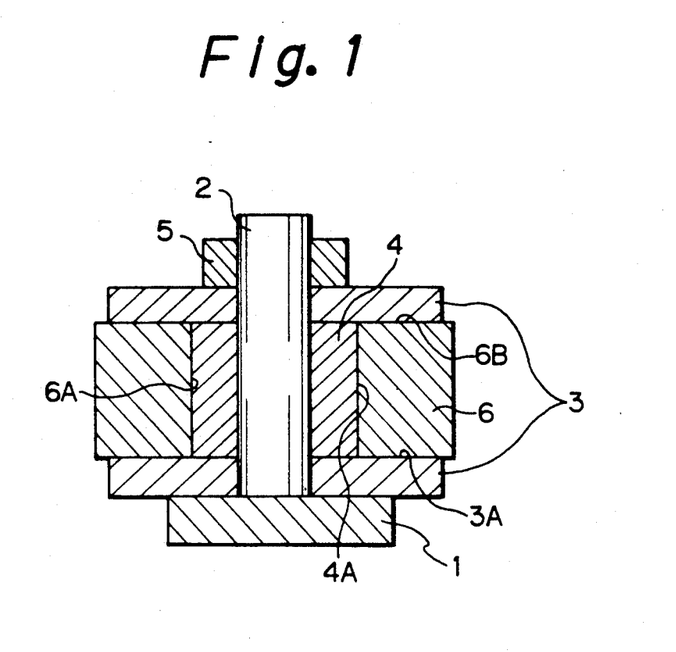
FIG. 1 is a sectional view showing a first embodiment of the bearing structure according to the present invention.

FIG. 1 is a sectional view showing a first embodiment of the bearing structure according to the present invention.

In the figure, reference numeral 1 denotes a base, which has a support shaft 2 stood on the central portion thereof. A radial cylindrical member 4 is secured to the outer periphery of the support shaft 2 in such a manner that the cylindrical member 4 is concentric with the support shaft 2.

A pair of upper and lower thrust plates 3 are clamped from the upper and lower sides by the base 1 and a fixing member 5 and thus fixedly clamped tightly to the end surfaces of the radial cylindrical member 4.

A radial sleeve 6 is rotatably mounted with predetermined clearances provided between the sleeve 6 on the one hand and the radial cylindrical member 4 and the thrust plates 3 on the other.

Figure 2:
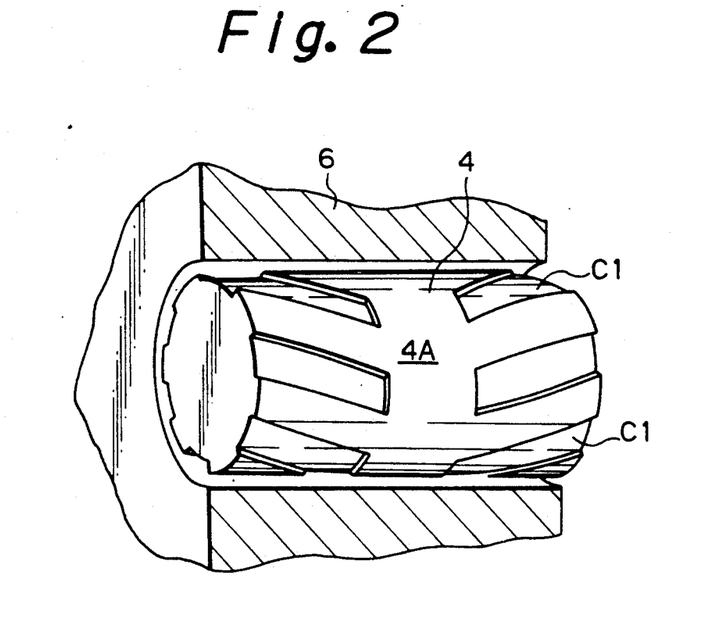
FIG. 2 is a perspective view showing our example of dynamic pressure generating grooves formed in a radial bearing member.
Figure 3:
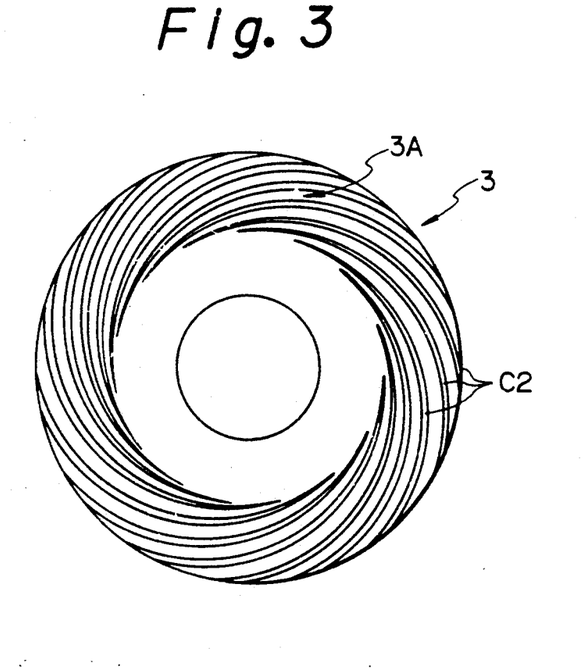
FIG. 3 is a perspective view exemplarily showing dynamic pressure generating grooves formed in a thrust bearing member.

The surface 4A of the radial cylindrical member 4 that faces the radial sleeve 6 has herringbone-shaped grooves $C_1$ for generating dynamic pressure, such as those shown in FIG. 2, and the surface 3A of each thrust plate 3 that faces the radial sleeve 6 has spiral grooves $C_2$ for generating dynamic pressure, such as those shown in FIG. 3.

When an outer rotor type spindle motor is provided with the bearing structure having the above-described arrangement, as the radial sleeve 6 rotates, a pneumatic pressure is generated between the inner surface 3A of each thrust plate 3 and the end surface 6B of the radial sleeve 6 that faces it, thus forming a pneumatic thrust bearing. Similarly, a pneumatic pressure is generated between the outer peripheral surface 4A of the radial cylindrical member 4 and the inner peripheral surface 6A of the radial sleeve 6 that faces it, thus forming a pneumatic radial bearing.

Thus, the radial sleeve 6 is supported without being in solid contact with the thrust plates 3 and the radial cylindrical member 4. The spindle motor is therefore capable of smoothly rotating at high speed. Accordingly, the spindle motor bearing structure of the present invention is free from the problem of friction and vibration in contrast to the prior art that employs ball bearings.

It should be noted that the inner peripheral surface 6A of the radial sleeve 6 may be formed with the dynamic pressure generating grooves $C_1$, with the outer peripheral surface 4A of the radial cylindrical member 4 being smooth, and each end surface 6B of the radial sleeve 6 may be formed with the dynamic pressure generating grooves $C_2$, with the surface 3A of each thrust plate 3 being smoothed.

Figure 4:
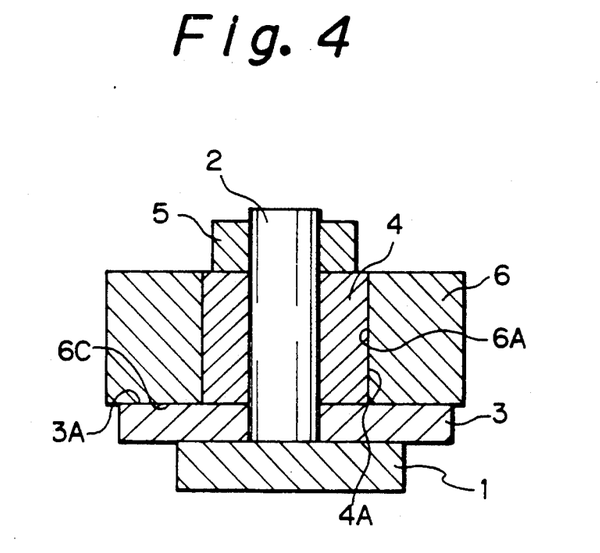
FIG. 4 is a sectional view showing a second embodiment of the bearing structure according to the present invention.

FIG. 4 is a sectional view showing a second embodiment of the bearing structure according to the present invention.

In the second embodiment, a single thrust plate 3 is disposed only between the base 1 and the lower end surfaces of the radial cylindrical member 4 and the radial sleeve 6. The radial sleeve 6 is rotatably mounted with predetermined clearances provided between the same sleeve 6 on the one hand and the radial cylindrical member 4 and the thrust plate 3 on the other.

Since the arrangements of the other members or portions are substantially the same as those in the first embodiment, description thereof is omitted.

When an outer rotor type spindle motor is arranged with the bearing structure according to the second embodiment, as the radial sleeve 6 rotates, a pneumatic pressure is generated between the upper surface 3A of the thrust plate 3 and the lower end surface 6C of the radial sleeve 6 that faces it, thus forming a pneumatic thrust bearing. Similarly, a pneumatic pressure is generated between the outer peripheral surface 4A of the radial cylindrical member 4 and the inner peripheral surface 6A of the radial sleeve 6 that faces it, thus forming a pneumatic radial bearing.

Thus, the radial sleeve 6 is supported without being in solid contact with the thrust plate 3 and the radial cylindrical member 4, and the spindle motor is therefore capable of smoothly rotating at high speed, in the same way as in the first embodiment. Accordingly, the spindle motor bearing structure of the present invention is free from the problem of friction and vibration.

In the second embodiment also, the inner peripheral surface 6A of the radial sleeve 6 may be formed with dynamic pressure generating grooves, with the outer peripheral surface 4A of the radial cylindrical member 4 being smooth, and the lower end surface 6C of the radial sleeve 6 may be formed with dynamic pressure generating grooves, with the upper surface 3A of the thrust plate 3 being smoothed.

Figure 5:
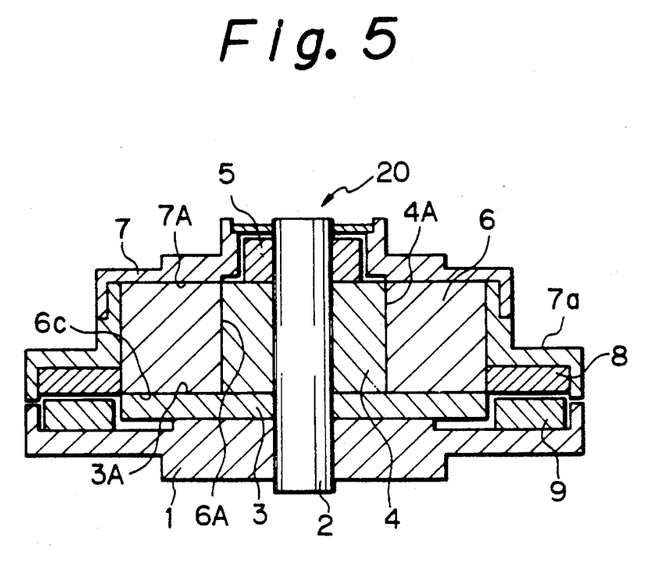
FIG. 5 is a sectional view showing the structure of a spindle motor according to a third embodiment of the present invention.

FIG. 5 is a sectional view of a spindle motor according to a third embodiment of the present invention. It should be noted that the bearing structure that is employed for the spindle motor shown in FIG. 5 is the same as in the embodiment shown in FIG. 4.

Referring to FIG. 5, a hub 7, which serves as a rotor, has a cup-shaped configuration with a through-hole in the center for insertion of the support shaft 2. The lower end of the hub 7 extends horizontally outward to define a lower end portion 7a. The radial sleeve 6 is secured to the inner peripheral surface 7A of the hub 7.

A magnet member 8 is secured to the bottom surface of the lower end portion 7a of the hub 7, and the base 1 is provided with a stator coil 9 which faces the magnet member 8.

The hub 7 is arranged such that a disk (not shown) can be mounted on the outer periphery thereof. Thus, the disk, together with the hub 7, constitutes a motor rotor.

A spindle motor which is generally denoted by reference numeral 20 is a so-called thrust gap type spindle motor, in which the stator coil 9 and the magnet member 8 constitute in combination a driving part and magnetically press the motor rotor against the thrust plate 3.

The surface 4A of the radial cylindrical member 4 that faces the radial sleeve 6 has herringbone-shaped grooves $C_1$ for generating dynamic pressure, such as those shown in FIG. 2, and the surface 3A of the thrust plate 3 that faces the radial sleeve 6 has spiral grooves $C_2$ for generating dynamic pressure, such as those shown in FIG. 3.

In the spindle motor 20, as the stator coil 9 is sequentially supplied with an electric current, the hub 7 having the magnet member 8 secured thereto begins to rotate and consequently a pneumatic pressure is generated between the upper surface 3A of the thrust plate 3 and the lower end surface 6C of the radial sleeve 6 that faces it, thus forming a pneumatic thrust bearing. Similarly, a pneumatic pressure is generated between the outer peripheral surface 4A of the radial cylindrical member 4 and the inner peripheral surface 6A of the radial sleeve 6 that faces it, thus forming a pneumatic radial bearing. Thus, the radial sleeve 6 is supported without being in solid contact with the thrust plate 3 and the radial cylindrical member 4. The spindle motor is therefore capable of smoothly rotating at high speed. Accordingly, the spindle motor bearing structure of the present invention is free from the problem of friction and vibration in contrast to the prior art that employs ball bearings.

By virtue of the above-described structure of the spindle motor 20, the radial hydrodynamic bearing that comprises the radial cylindrical member 4 and the radial sleeve 6 is relatively long, that is, substantially the same as the height of the hub 7. Accordingly, the effective working pressure range within which sufficient load carrying capacity is provided increases, and the radial vibration decreases. Since the radial hydrodynamic bearing is prevented from forming a cantilever structure, the starting torque is minimized.

Although in the above-described embodiment the length of the radial hydrodynamic bearing is substantially the same as the height of the hub 7, it should be noted that the length of the radial hydrodynamic bearing may be smaller than the height of the hub 7 depending on circumstances. In addition, since the radial hydrodynamic bearing is long and a large dynamic pressure is therefore generated, the radial cylindrical member 4 and the radial sleeve 6 are not required to be machined to any particularly high degree of accuracy.

When the spindle motor that has the above-described structure is used in a vertical position, the range of preload applied in the thrust direction by the magnetic force from the magnet member 8 depends on the dynamic pressure generated between the thrust plate 3 and the radial sleeve 6, the weight of the motor rotor that is applied to the thrust plate 3 and the machining accuracy of the thrust plate 3 and the radial sleeve 6. However, it is, basically, only necessary to satisfy the following relationship:

$$P < 100 \times S^2 - W \qquad (1)$$

wherein P: the preload [g] applied by the magent member 8; S: the area [cm²] of the thrust bearing; and W: the weight [g] of the motor rotor. In the above relationship, $100 \times S$ is the dynamic pressure [g/cm²] required for the rotor to rotate without solid contact through a hydrodynamic bearing finished by an existing, economical finishing process.

When the spindle motor that has the above-described structure is used in a horizontal position, if no preload is applied in the thrust direction by magnetic force, the weight of the motor rotor is not applied to the thrust plate 3. Accordingly, an inclination of the support shaft 2 with respect to the radial bearing causes local contact of the bearing members, resulting in an increase in the starting torque. When the spindle motor is started, the motor rotor is sprung out in the thrust direction and is therefore unable to rotate stably. It is therefore preferable to apply in advance a force to the thrust plate 3 in a counter direction to the dynamic pressure generated from the thrust bearing, that is, to preload the thrust plate 3, by utilizing the magnet member 8, which constitutes the driving part of the spindle motor.

In the above-described spindle motor 20, the radial cylindrical member 4 and the radial sleeve 6, which comprise a radial hydrodynamic bearing, and the thrust plate 3 and the radial sleeve 6, which comprise a thrust hydrodynamic bearing, rotate without contacting each other, with air therebetween which is compressed during the rotation of the motor. Accordingly, these bearing members may be made of any kind of material as long as it can be machined with a high degree of accuracy. Any of generally employed metallic materials and organic materials may be utilized. The point is that it is necessary to minimize the frictional resistance and wear of the bearing members at the time when the motor is started and rotating at low speed. The range of usable materials therefore depends upon the bearing structure adopted.

In the embodiments shown in FIGS. 1, 4 and 5, the size of each of the radial cylindrical member 4 and the radial sleeve 6, which comprise a radial hydrodynamic bearing, and the thrust plate 3 and the radial sleeve 6, which comprise a thrust hydrodynamic bearing, is increased to reduce the surface pressure acting on the contact surfaces and the magnet member 8 is utilized to effect preloading to thereby attain a structure which is free from any local contact. As a result, the range of materials usable for these bearing members is enlarged.

If the members that constitute the bearings are made of, for example, a stainless steel, and a thin coat of lubricant is applied to the contact surfaces, it is possible to maintain a stable performance for a long period of time. However, no lubricant can be used in certain environments where the spindle motor is used. In such a case, it is preferable to employ a material which is superior in wear-resistant and sliding properties, particularly a ceramic material. Silicon carbide or alumina is particularly suitable for such an application.

The outer peripheral surface of the radial cylindrical member 4 and the inner peripheral surface of the radial sleeve 6, which comprise a radial hydrodynamic bearing, are each produced by coating a base material thereof with a material which is different from the base material, or surface treating the base material. Similarly, the end surface of the radial sleeve 6 and the surface of the thrust plate 3, which comprise a thrust hydrodynamic bearing, are each produced by coating a base material thereof with a material which is different from the base material, or surface treating the base material.

The material used for coating the base material can consist of the same components of the base material, e.g., a certain nickel coating can form a layer which is harder and less porous than the nickel material of the base material and can improve the smoothness of the base surface. Accordingly, the material which is different from the base material described in this specification and claims includes materials of the same kind but different in physical or chemical properties.

Figure 6:
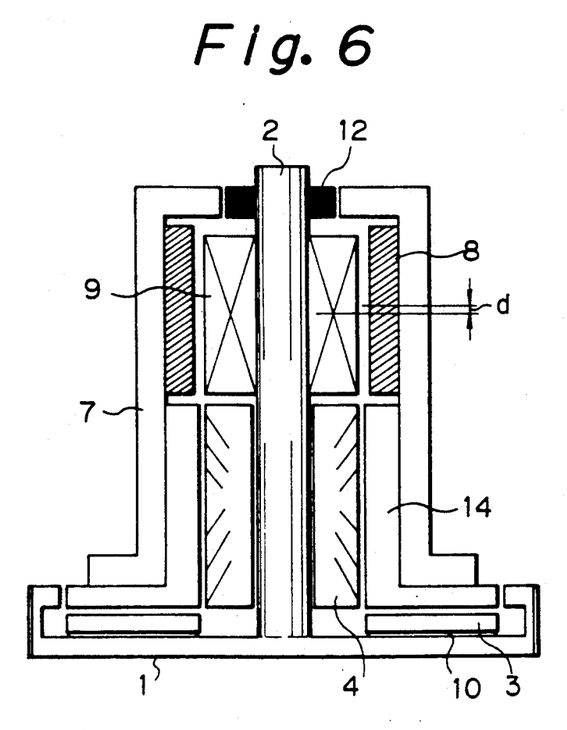
FIG. 6 is a sectional view showing the structure of a spindle motor according to a fourth embodiment of the present invention.

FIG. 6 shows a spindle motor according to a fourth embodiment of the present invention. A support shaft 2 is disposed in the center of a base 1, and an annular thrust plate 3 made of a resilient material, is disposed at a position which is a predetermined distance away from the outer periphery of the support shaft 2 with a resilient pad 10 therebetween. A radial cylindrical member 4 is secured to the outer peripheral portion of the support shaft 2 in such a manner that the cylindrical member 4 is concentric with the support shaft 2. A plurality of equally spaced stator coils 9 are secured to the support shaft 2 above the radial cylindrical member 4.

A hub 7, which has a cap-shaped configuration, is supported at the top by a ball bearing 12, which is a kind of rolling bearing, the ball bearing 12 being attached to the support shaft 2. An annular member 14 which has an L-shaped cross-sectional configuration is rigidly secured to the lower end portion of the hub 7. The lower end portion of the annular member 14 faces the annular thrust plate 3 to form a spiral groove hydrodynamic thrust bearing, whereas the inner peripheral surface of the annular member 14 faces the radial cylindrical member 4 to form a herringbone-shaped groove hydrodynamic radial bearing.

In addition, a magnet member 8 comprising a plurality of equally spaced rotor magnets or magnetic pieces such as iron cores is secured to the inner periphery of the hub 7 at a position which faces the stator coils 9.

As the stator coils 9 are sequentially supplied with en electric current, the hub 7 having the magnet member 8 secured thereto begins to rotate and consequently a pneumatic thrust bearing is formed between the upper surface of the annular thrust plate 3 and the lower end surface of the annular member 14. Similarly, a pneumatic bearing is formed between the outer peripheral surface of the radial cylindrical member 4 and the inner peripheral surface of the annular member 14. Thus, the annular member 14 is supported without being in solid contact with the associated bearing members. The spindle motor is therefore capable of smoothly rotating at high speed. Accordingly, the spindle motor bearing structure of the present invention is free from the problem of friction and vibration in contrast to the prior art that employs ball bearings.

The surface of the radial cylindrical member 4 that faces the annular member 14 is formed with grooves for generating dynamic pressure, for example, the herringbone-shaped grooves $C_1$ shown in FIG. 2, and the surface of the annular thrust plate 3 that faces the annular member 14 is formed with grooves for generating dynamic pressure, for example, the spiral grooves $C_2$ shown in FIG. 3.

It should be noted that the inner peripheral surface and lower end surface of the annular member 14 may be formed with dynamic pressure generating grooves, with the outer peripheral surface of the radial cylindrical member 4 and the upper surface of the annular thrust plate 3 being smooth.

The outer peripheral surface of the radial cylindrical member 4 and the inner peripheral surface of the annular member 14 having an L-shaped cross-sectional configuration, which comprise a radial hydrodynamic bearing, are each produced by coating a base material thereof with a material which is different from the base material, or surface treating the base material. Similarly, the upper surface of the annular thrust plate 3 and the end surface of the annular member 14, which comprise a thrust hydrodynamic bearing, are each produced by coating a base material thereof with a material which is different from the base material, or surface treating the base material.

The material used for coating the base material can consist of the same components of the base material, e.g., a certain nickel coating can form a layer which is harder and less porous than the nickel material of the base material and can improve the smoothness of the base surface. Accordingly, the material which is different from the base material described in this specification and claims includes materials of the same kind but different in physical or chemical properties.

In the spindle motor having the above-described arrangement, as the stator coils 9 are sequentially supplied with an electric current, the hub 7 having the magnet member 8 secured thereto begins to rotate about the center of the ball bearing 12. At the same time, a pneumatic pressure is generated between the upper surface of the annular thrust plate 3 and the lower end surface of the annular member 14 which faces it, thus forming a pneumatic thrust bearing. Similarly, a pneumatic pressure is generated between the outer peripheral surfae of the radial cylindrical member 4 and the inner peripheral surface of the annular member 14 which faces it, thus forming a pneumatic radial bearing. As the rotational speed of the hub 7 increases to a high level, the above-described pneumatic pressures increase correspondingly, to that the bearing clearances of the hydrodynamic bearings become uniform and the degree of concentricity between the hub 7 and the support shaft 2 increases. More specifically, in the early stage of the rotation of the hub 7 where the bearing clearances of the hydrodynamic bearings are not uniform, the hub 7 rotates through the ball bearing 12, whereas, when it rotates at high speed, the annular member 14 is supported without being in solid contact with the annular thrust plate 3 and the radial cylindrical member 4. The spindle motor is therefore capable of smoothly rotating at high speed. Accordingly, the spindle motor bearing structure of the present invention is free from the problem of friction and vibration in contrast to the prior art that employs ball bearings only.

In the spindle motor having the above-described arrangement, the radial cylindrical member 4 and the annular member 14, which comprise a radial hydrodynamic bearing, and the annular thrust plate 3 and the annular member 14, which comprise a thrust hydrodynamic bearing, rotate without contacting each other, with air which is compressed during the rotation of the motor therebetween. Accordingly, these bearing members may be made of any kind of material as long as it can be machined with a high degree of accuracy. Any of generally employed metallic materials and organic materials may be utilized. The point is that it is necessary to minimize the frictional resistance and wear of the bearing members at the time when the motor is started and rotating at low speed. The range of usable materials therefore generally depends upon the bearing structure adopted.

In this embodiment, the ball bearing 12 is used together with the hydrodynamic bearings to reduce the frictional resistance that acts in the hydrodynamic bearings when the spindle motor is started, and preloading is effected in a counter direction to the dynamic pressure generated from the thrust bearing by utilizing the magnetic force from the magnet member 8 to attain a structure which is free from any local contact. In consequence, the range of materials usable for these bearing members is enlarged as in the case of the embodiment shown in FIG. 5.

The preloading may be effected by offsetting the axial center of the group of magnet member 8 from the axial center of the group of stator coils 9 upwardly, that is, in a direction in which the magnet member 8 moves away from the thrust bearing by a distance d shown in FIG. 6. In more detail, the spindle motor shown in FIG. 6 includes a radial gap between the magnet member 8 and the stator coils 9, and the magnetic force center of the axial length of the magnet member 8 is a distance d is from the magnetic force center of the axial length of the stator coil 5, so that a magnetic force acts so as to make the center of the magnet member 8 coincident with the center of the stator coils 9, thus enabling the preloading.

In addition, in order to ensure the required perpendicularity between the radial and thrust hydrodynamic bearings at the time of assembly, the resilient pad 10, made of a resilient material, is interposed between the base 1 and the annular thrust plate 3. Thus, the resilient pad 10 functions as an aligning member and the perpendicularity can therefore be achieved with ease. The resilient pad 10 may be formed from any resilient material. However, a material which is readily available, such as silicone rubber, is preferable.

Although the spindle motors described above are so-called synchronous spindle motors in which a plurality of equally spaced stator coils 9 are disposed on the outer periphery of the support shaft 2 and rotor magnets of magnets member 8 are disposed on the inner periphery of the hub 7 in opposing relation to the stator coils 5, the spindle motors are not necessarily limited to such synchronous motors but may be in the form of induction motors by replacing the rotor magnets with rotor cores.

Figure 7:
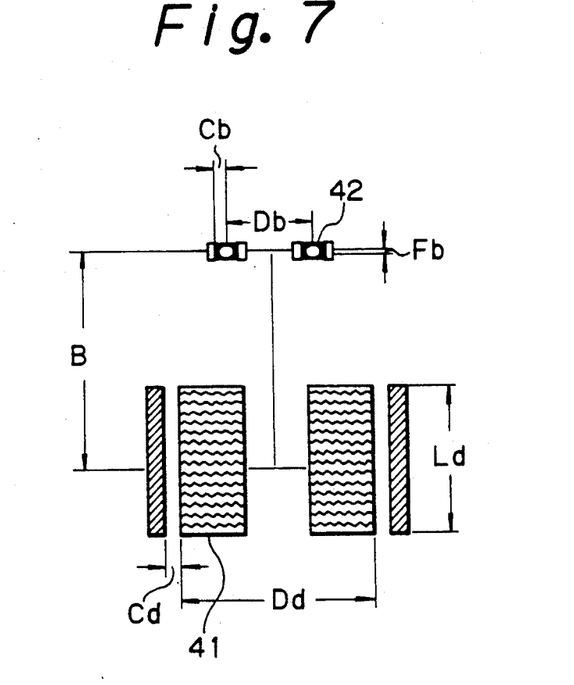
FIG. 7 is a conceptual view showing the arrangement of the spindle motor bearing structure shown in FIG. 6.

FIG. 7 is a conceptual view showing the bearing structure according to the present invention. It is assumed that the diameter of a radial hydrodynamic bearing 41 is Dd, the length is Ld, the clearance is Cd and the axial center distance between the radial hydrodynamic bearing 41 and a ball bearing 42 is B. It has been confirmed that, when the spindle motor is used in a vertical position under the conditions of, for example, Cd=several microns, B/Ld=1, Ld/Dd=1, if a bearing in which the radial clearance Cb is about 5 microns is employed as the ball bearing 42, the rotor rotates while being effectively supported by the ball bearing 42 at the time of starting the motor.

When the motor is used in a horizontal position, it can be used under the same conditions as in the vertical position by applying a preload by magnetic force.

By jointly using an ordinary rolling bearing, as described above, the starting torque can be readily minimized, and although the bearing structure employs two different kinds of bearing, the assembly is facilitated since one of the two is a rolling bearing.

Although in the embodiments of FIGS. 5, 6 and 7 the bearing structure of the present invention is applied to spindle motors, it should be noted that the application of the bearing structure of the present invention is not necessarily limited to spindle motors and that the bearing structure of the present invention is widely applicable to rotating members which are designed to rotate at high speed with minimal vibrations.

As has been described above, the present invention provides the following advantageous effects:

(1) It is easy to obtain the required perpendicularity between the radial and thrust bearings at the time of assembly.

(2) Since the radial sleeve functions as bearing members of both the radial and thrust bearings, the number of parts decreases and the structure is simplified.

(3) Since the radial bearings is arranged to bear the rotor over a predetermined range which includes at least the center of gravity of the rotor, the motor rotates stably, particularly when it is operated in a horizontal position.

(4) Since the radial bearing is relatively long, it is prevented from forming a cantilever structure and the starting torque is therefore minimized. In addition, since the constituent members of the radial bearing are not required to be machined to any particularly high degree of accuracy, the product cost is lowered.

(5) By applying a preload in the thrust direction, it is possible to prevent local contact of the bearing members and hence minimize the starting torque.

(6) The presence of the antagonistic force to the dynamic pressure enables stable rotation.

In particular, when the motor is used in a horizontal position, the motor rotor rotates stably without being sprung out by the dynamic pressure acting in the thrust direction.

(7) If the members that constitute thrust and radial bearings are formed from a ceramic material, the spindle motor can be used without lubrication or with minimal lubrication.

(8) If a ceramic material which has a high rigidity is employed, deformation due to high-speed rotation can be minimized and it is possible to achieve high-speed rotation which cannot be achieved by the conventional ball bearings.

(9) The starting torque can be reduced by employing a rolling bearing that has a radial clearance which is conformable, in a fairly wide range, to the following parameters that determine a bearing structure, i.e., the diameter, length and clearance of the hydrodynamic radial bearing and the axial center distance between the rolling bearing and the radial bearing.

(10) Despite the employment of a rolling bearing, it is possible to achieve superior hydrodynamic bearing characteristics during rotation.

(11) Since one of the bearings is a rolling bearing, it is possible to readily increase the dimensional accuracy at the time of assembling.

(12) Since a resilient pad is interposed between the thrust bearing and the stator, the required perpendicularity between the radial and thrust hydrodynamic bearings can be achieved with ease.

What is claimed is:

1. A bearing structure comprising:
a stator having a support shaft which is disposed on a base, a radial cylindrical member which is concentric with said support shaft and having a cylindrical member end surface perpendicular to the axis of said support shaft, and a thrust plate fixedly clamped tightly to said radial cylindrical member at only one end thereof and having a thrust plate flat surface against the cylindrical member end surface of said radial cylindrical member so as to cause said thrust plate flat surface to extend radially of said support shaft and having a portion of said thrust plate flat surface extending radially outwardly of said radial cylindrical member, said support shaft extending through the center of said radial cylindrical member and said thrust plate;
a rotor having a radial sleeve having an inner peripheral surface which is concentric with said support shaft and having a radial sleeve end surface perpendicular to said inner peripheral surface;
the inner peripheral surface of said radial sleeve and the outer peripheral surface of said radial cylindrical member being in spaced opposed bearing relationship with each other and one being provided with herringbone-shaped grooves for generating dynamic pressure for forming a radial hydrodynamic bearing; and
said radial sleeve end surface of said radial sleeve and said radially outwardly extending portion of said flat thrust plate surface of said thrust plate being in spaced opposed bearing relationship with each other and one being provided with spiral grooves for generating dynamic pressure for forming a thrust hydrodynamic bearing.

2. A bearing structure according to claim 1, further comprising a cap-shaped hub which is secured to said rotor, said hub having a horizontally extended lower end portion, a magnet member which is secured to the bottom surface of said lower end portion, and a stator coil which is secured to said base in opposing relation to said magnet member to form a driving part, so that a spindle motor is formed from said bearing structure, said hub and said driving part.

3. A bearing structure according to any one of claims 1 and 2, wherein said thrust hydrodynamic bearing is preloaded by a magnetic force acting counter to a dynamic pressure acting in the direction of thrust.

4. A bearing structure according to any one of claims 1 and 2, wherein said radial hydrodynamic bearing is disposed so as to bear said rotor over a predetermined range including the center of gravity of said rotor.

5. A bearing structure according to any one of claims 1 and 2, wherein at least one of the opposing annular sliding surfaces that constitute said thrust hydrodynamic bearing is produced by coating a base material thereof with a material which is different from said base material, or surface treating said base material.

6. A bearing structure according to any one of claims 1 and 2, wherein the opposing annular sliding surfaces that constitute said thrust hydrodynamic bearing are formed from a ceramic material.

7. A bearing structure according to claim 6, wherein said ceramic material is either silicon carbide or alumina.

8. A bearing structure according to any one of claims 1 and 2, wherein at least one of the opposing cylindrical sliding surfaces that constitute said radial hydrodynamic bearing is produced by coating a base material thereof with a material which is different from said base material, or surface treating said base material.

9. A bearing structure according to any one of claims 1 and 2, wherein the opposing cylindrical sliding surfaces that constitute said radial hydrodynamic bearing are formed from a ceramic material.

10. A bearing structure according to claim 9, wherein said ceramic material is a material taken from the group consisting of silicon carbide or alumina.

* * * * *